(12) United States Patent
Kester

(10) Patent No.: US 7,131,384 B2
(45) Date of Patent: Nov. 7, 2006

(54) SEED TUBE GUARD ASSEMBLY FOR AGRICULTURAL PLANTERS

(76) Inventor: Philip C. Kester, 3802 Jean St., East Moline, IL (US) 61244

( * ) Notice: Subject to any disclaimer, the term of this patent is extended or adjusted under 35 U.S.C. 154(b) by 0 days.

(21) Appl. No.: 11/199,745

(22) Filed: Aug. 8, 2005

(65) Prior Publication Data

US 2006/0032420 A1 Feb. 16, 2006

Related U.S. Application Data

(60) Provisional application No. 60/601,513, filed on Aug. 12, 2004.

(51) Int. Cl.
*A01C 7/00* (2006.01)
*A01C 9/00* (2006.01)
(52) U.S. Cl. ............................. 111/170; 111/200
(58) Field of Classification Search ............. 111/107, 111/170, 149, 120, 121, 164, 200; 172/29, 172/31

See application file for complete search history.

(56) References Cited

U.S. PATENT DOCUMENTS

| | | | | |
|---|---|---|---|---|
| 3,175,427 A | * | 3/1965 | Bridwell et al. | 76/108.1 |
| 4,256,184 A | * | 3/1981 | Squibb | 172/531 |
| 4,683,781 A | * | 8/1987 | Kar et al. | 76/108.2 |
| 5,598,795 A | * | 2/1997 | House | 111/186 |
| 5,664,507 A | * | 9/1997 | Bergland et al. | 111/140 |
| 5,697,308 A | * | 12/1997 | Rowlett | 111/149 |
| 6,178,901 B1 | * | 1/2001 | Anderson | 111/197 |
| 6,237,696 B1 | * | 5/2001 | Mayerle | 172/558 |
| 6,260,632 B1 | * | 7/2001 | Bourgault et al. | 172/566 |
| 6,363,871 B1 | * | 4/2002 | Puetz et al. | 111/152 |
| 6,640,731 B1 | * | 11/2003 | Rowlett et al. | 111/152 |

* cited by examiner

*Primary Examiner*—Christopher J. Novosad
(74) *Attorney, Agent, or Firm*—Jeffrey L. Thompson; Thompson & Thompson, P.A.

(57) ABSTRACT

A seed tube guard assembly for agricultural planters has floating wear plates to improve the wear life of the seed tube guard. The assembly includes a support bracket having an upper end attached to a planter shank assembly and a lower end positioned between a pair of opener disks. A seed tube guide extends rearwardly from the support bracket for receiving a lower end of a seed tube. A pair of dowels are pressed into openings in the support bracket and protrude from the sides thereof. A metal ball is press fit into an opening in the support bracket between the dowels with opposite sides of the metal ball protruding from the respective sides of the support bracket. The floating wear plates are supported by the dowels on the respective sides of the support bracket with the metal ball engaging the wear plates at respective fulcrum points between the dowels.

15 Claims, 6 Drawing Sheets

SEED TUBE GUARD ASSEMBLY FOR AGRICULTURAL PLANTERS

RELATED APPLICATIONS

This application claims the benefit of the Applicant's U.S. provisional patent application Ser. No. 60/601,513 filed on Aug. 12, 2004.

BACKGROUND OF THE INVENTION

1. Field of the Invention

The present invention relates generally to agricultural planters. In particular, the present invention relates to seed tube guards with improved durability for use with agricultural planters.

2. Description of the Prior Art

The first modern planter was the John Deere 7000 series introduced in 1973. It is depicted in FIGS. 1 and 2 of the accompanying drawings. This design utilizes two opener disks 11 that contact at one point 12 and diverge at a small angle to form a furrow 13 in the ground. The depth of the furrow is determined by the adjustable position of the gauge wheels 14. The seed is dropped into a seed tube 15 and falls into the furrow 13. A pair of closing wheels 16 are mounted at an angle behind the seed tube 15 and are spring-loaded to exert a downward force on the ground. The closing wheels 16 close the furrow 13 and thereby cover the seed with soil.

Another component of this system, generally called a "seed tube guard" 21, is shown in FIG. 3. The seed tube guard 21 shown in FIG. 3 is a forging and is basically the same as currently used on John Deere planters. The seed tube guard 21 is made from medium carbon steel and is heat-treated. A seed tube guide 22 was added to keep the seed tube 15 centered on the seed tube guard 21. The seed tube guard 21 is attached to the shank assembly 23 with two ¼ inch diameter roll pins 24 just below the studs 26 to which the opener disks 11 are mounted. The holes 25 in the shank assembly 23 are 5/16 inch diameter and allow the seed tube guard 21 to align itself as the opener disks 11 flex.

Ground pressure causes the opener disks 11 to deflect inward until they contact the wear surfaces 27 of the seed tube guard 21. Although the seed tube guard 21 might deflect rocks and other debris, the seed tube guard 21 mainly protects the seed tube 15 by maintaining a distance between the opener disks 11. A better seed furrow 13 results from maintaining a proper distance between the opener disks 11.

It is generally known that most seed tube guards 21 supplied as original equipment have a short wear life. This is due primarily to the inadequate wear resistance of the material and also the small wear surface 27. The oversize sheet metal holes 25 in the shank assembly 23 are also subject to excessive wear.

Seed tube guards of most other manufacturers are similar to the seed tube guards 21 described above, except they are sometimes made from cast iron. The seed tube guards (not illustrated) on 3000 series planters recently introduced by Kinze Manufacturing are heat-treated steel castings. The mounting of this seed tube guard is substantially different in that it is bolted rigidly to the shank assembly.

International Harvester (IH) and several similar planters (not illustrated) have a guard and a box incorporated into the shank assembly. The apparent purpose of this box is to direct the seed into the furrow without contacting the opener disks. It also would reduce the amount of dry soil dropping into the furrow.

A conventional seed tube guard 21 with a stainless steel box 28 is shown in FIG. 4. The box 28 is welded to the conventional seed tube guard 21, and the seed tube guard 21 is mounted to the shank assembly with 5/16 inch diameter bolts. This arrangement is produced by J.S. Ag Innovations Inc. and is similar to that used on IH planters.

The IH design also incorporates a flexible flap (not illustrated) into the box, the apparent purpose of which is to reduce bouncing of the seed. J.S. Ag Innovations also produces a similar device, but it is mounted into the end of the seed tube.

SUMMARY OF THE INVENTION

It is an object of the present invention to provide a seed tube guard assembly that overcomes the problems and disadvantages with the various prior art devices described above.

It is a further object of the present invention to provide an improved seed tube guard assembly that has a long wear life, that prevents damage to the inner surface of the opener disks, that reduces maintenance required for the planter, that allows a furrow having a consistent width to be produced by the planter for a longer period of time for more accurate seed placement, that provides wide and narrow options to accommodate different opener assemblies, that has a durable mounting system for attaching to the planter shank, and that has wear plates which are simple to remove and replace.

To accomplish these and other objects of the invention, a seed tube guard assembly is provided for agricultural planters which has floating wear plates to improve the wear life of the seed tube guard assembly. The assembly includes a support bracket having an upper end attached to a planter shank assembly and a lower end positioned between a pair of opener disks. A seed tube guide extends rearwardly from the support bracket for receiving a lower end of a seed tube. A pair of dowels are pressed into openings near the lower end of the support bracket and protrude from the right and left sides of the support bracket. A metal ball is press fit into an opening in the support bracket between the dowels with opposite sides of the metal ball protruding from the right and left sides of the support bracket. The floating wear plates each have a pair of holes for mounting the wear plates over the dowels on the respective right and left sides of the support bracket with the protruding sides of the metal ball engaging the wear plates at respective fulcrum points between the dowels.

According to a broad aspect of the present invention, a seed tube guard assembly for an agricultural planter is provided, comprising: a support bracket having an upper end adapted to be attached to a planter shank assembly and a lower end adapted to be positioned between a pair of opener disks; a seed tube guide extending from a rear side of the support bracket for centering a seed tube between the pair of opener disks, preventing seed falling from the seed tube from contacting inner surfaces of the opener disks, and preventing soil from falling into a furrow made by the opener disks before seed has been placed in the furrow; and first and second floating wear plates disposed on respective right and left sides of the support bracket in front of the seed tube guide for engaging inner surfaces of the opener disks of the planter.

Numerous other objects of the present invention will be apparent to those skilled in this art from the following description wherein there is shown and described two preferred embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 2:
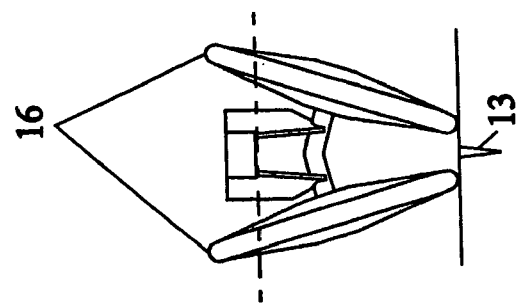
FIG. 2 is a rear view of the closing wheel assembly shown in FIG. 1.
Figure 1:
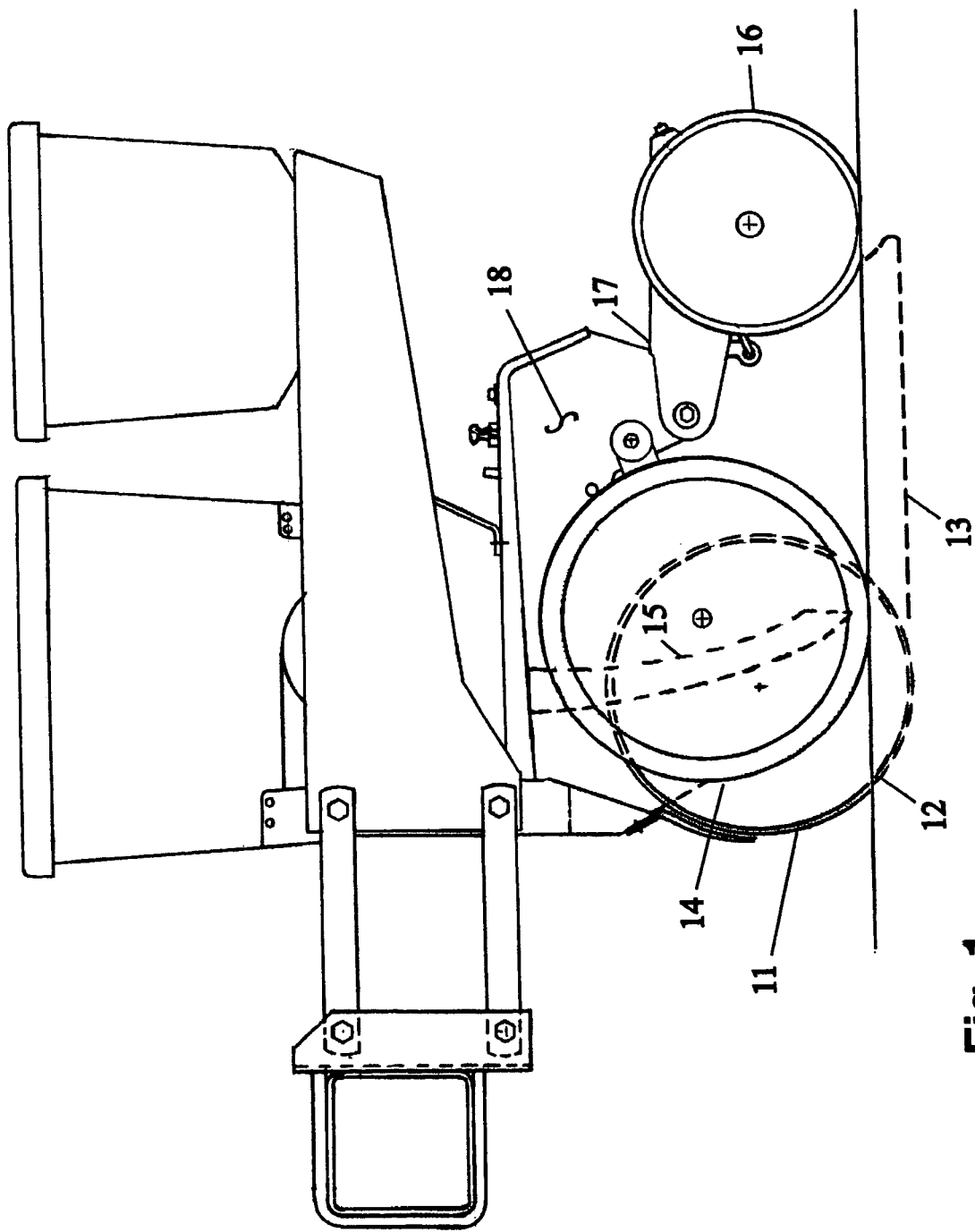
FIG. 1 is a side view of a planter unit and closing wheel assembly of a conventional John Deere 7000 series planter.
Figure 3:
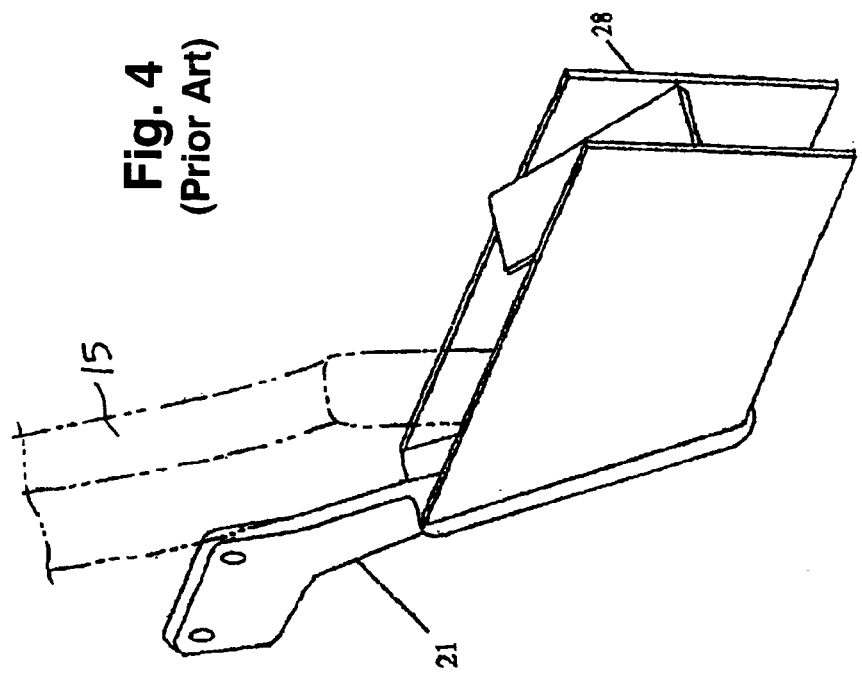
FIG. 3 is a perspective view of a conventional seed tube guard used in the planter unit of FIG. 1.

An improved seed tube guard assembly 30 according to the present invention will now be described in detail with reference to FIGS. 1, 2 and 5 to 12 of the accompanying drawings.

The seed tube guard assembly 30 of the present invention is mounted to a planter shank 23 of an agricultural planter between two opener disks 11 used to form a furrow 13 (see FIGS. 1 and 2) in soil for planting seeds. The opener disks 11 are rotatably mounted on respective right and left spindles 31, 32 attached to the planter shank 23 in a conventional manner. The lower end of the shank 23 has a slot 33 formed between right and left sides thereof for receiving an upper end portion of a support bracket 101 of the seed tube guard assembly 30. Openings 34 are provided in the lower end of the shank 23 to match the openings 35 provided in the upper portion of the support bracket 101 for attaching the support bracket 101 to the shank 23. The support bracket 101 can be formed, for example, of heat-treated steel having a thickness of about 0.188 inch.

A lower end of the support bracket 101 is positioned between the pair of opener disks 11. A seed tube guide 102 is secured to a rear side of the support bracket 101, for example, by welding or a bolted connection. The seed tube guide 102 has respective right and left sides that extend rearwardly from the rear side of the support bracket 101 and form a space therebetween for receiving a lower end 15L of a seed tube 15 of the planter. The seed tube guide 102 functions (1) to center the seed tube 15 between the opener disks 11, (2) to prevent seed falling from the seed tube 15 from contacting the inner surfaces of the opener disks 11, and (3) to prevent soil from falling into the furrow 13 made by the opener disks 11 before seed has been placed in the furrow 13.

Figure 5:
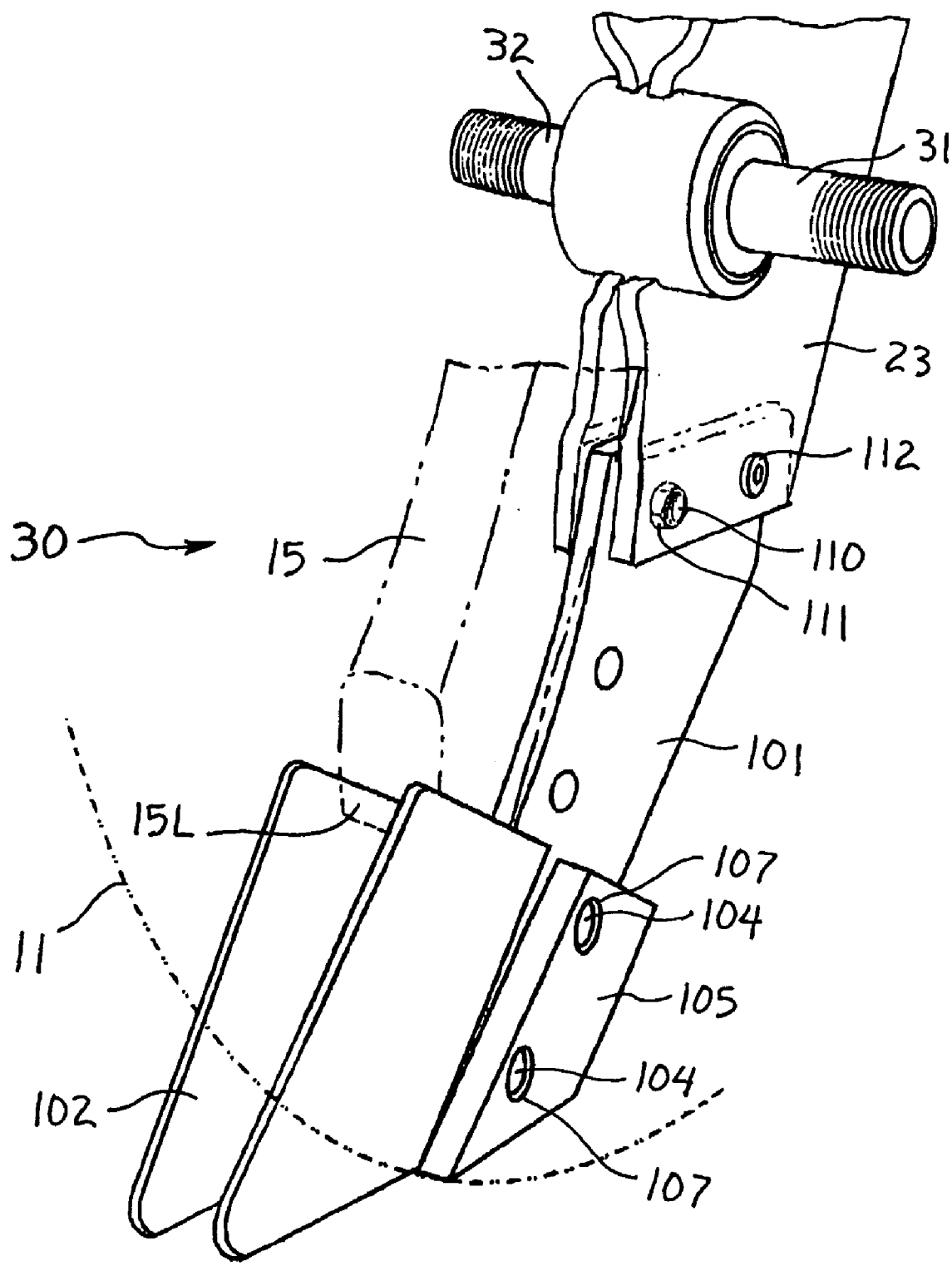
FIG. 5 is a perspective view of a seed tube guard assembly for planters according to the present invention.

The seed tube 15 of the planter extends along a rear side of the shank 23 and a rear side of the support bracket 101 with the lower end 15L of the seed tube positioned between the right and left sides of the seed tube guide 102, as shown in FIG. 5. The seed tube 15 can be secured to the shank 23 in a conventional manner using, for example, a hook (not shown) molded on the front of the seed tube 15 that hooks over a pin fastened to the shank assembly 23 above the spindles 31, 32.

First and second floating wear plates 105, 106 are disposed on respective right and left sides of the support bracket 101 in front of the seed tube guide 102 for engaging the inner surfaces of the opener disks 11. The wear plates 105, 106 are mounted to the respective sides of the support bracket 101 using a pair of pin members 104 protruding from each of the right and left sides of the support bracket 101. The pin members 104 can be, for example, dowels that are press fit into reamed openings 104a (FIG. 9) at the lower portion of the support bracket 101 and protrude from each of the right and left sides of the support bracket 101. For example, the pin members 104 can be dowels having a diameter of about 0.375 inch and a length of about 0.750 inch. The wear plates 105, 106 each have a pair of oversize holes 107 formed therein for receiving the pin members 104 and allowing the wear plates 105, 106 to move freely along the longitudinal direction of the pin members 104 relative to the support bracket 101.

Respective protrusions 103x, 103y are disposed between the pin members 104 on each of the right and left sides of the support bracket 101 for providing a fulcrum on which the respective floating wear plates 105, 106 pivot to allow wear to be nearly evenly distributed across the outer surfaces 105w, 106w of the wear plates 105, 106. In one embodiment, the protrusions 103x, 103y are formed by a metal ball 103 which is press fit into a reamed opening 103a in the support bracket 101 between the pin members 104. The metal ball 103 can also be staked into the support bracket 101 to reduce the chance of the ball 103 moving under load. The opposite sides of the metal ball 103 protrude from the right and left sides of the support bracket 101. The protruding portions 103x, 103y of the metal ball 103 function as the fulcrums on which the respective floating wear plates 105, 106 pivot during operation. The metal ball 103 can be, for example, a steel ball having a diameter of 0.375 inch.

In one embodiment, the wear plates 105, 106 each have an indentation 108 formed on an inner surface thereof for engaging the metal ball 103. The indentations 108 can be milled in the inner surfaces of the wear plates 105, 106 where they contact the protruding portions 103x, 103y of the ball 103. The indentations 108 allow the overall width of the seed tube guard assembly 30 to be reduced to accommodate opener assemblies with a narrow spacing between the opener disks 11. For example, the overall width of the seed tube guard assembly 30 in this embodiment with the indentations 108 formed on the inner surfaces of the wear plates 105, 106 can be established at approximately 0.81 inch.

In another embodiment, the wear plates 105, 106 are not provided with an indentation on the inner surface for engaging the metal ball 103. This results in a greater overall width of the seed tube guard assembly 30 for farmers who prefer a wider furrow. For example, the overall width of the guard assembly 30 in this embodiment without the indentations formed on the inner surfaces of the wear plates 105, 106 can be established at approximately 0.94 inch.

The wear plates 105, 106 each have an outer wear surface 105w, 106w facing outwardly from the support bracket 101, and a lower wear surface 105d, 106d facing downwardly from the support bracket 101. The outer wear surfaces 105w, 106w are the main wear surfaces and are engaged by the inner surfaces of the respective opener disks 11 during operation. The lower wear surfaces 105d, 106d are engaged by loose soil concentrated in this area during operation. The outer wear surfaces 105w, 106w and/or the lower wear surfaces 105d, 106d of the wear plates can be covered with a hard surface coating for increasing a wear life of the wear plates 105, 106. The hard surface coating can be, for example, a tungsten carbide nickel coating having a thickness of approximately 0.010 inch.

Alternatively, the wear plates 105, 106 can be made of steel which is heat treated to improve the wear life of the wear plates 105, 106. For example, the wear plates 105, 106 can be formed of heat treated 1095 steel having a thickness of about 0.312 inch. In this embodiment, the wear plates 105, 106 can have the indentations 108 on the inner surfaces thereof to result in an overall width of the seed tube guard assembly 30 of about 0.94 inch. This embodiment can provide a lower cost version of the wear plates 105, 106 for lower acreage planters, while the embodiment described above with the hard surface coating on the wear surfaces 105w, 106w and 105d, 106d may be more suitable for high acreage planters.

To facilitate assembly of the seed tube guard assembly 30, a double sided adhesive coated washer 109 formed, for example, of foam rubber, is positioned over the metal ball 103 on each side of the support bracket 101. The adhesive coated washer 109 functions to hold the wear plates 105, 106 in position on the pin members 104 during assembly until the opener disks 11 are secured in place. After assembly and during use, the wear plates 105, 106 are allowed to float relative to the support bracket 101 and are kept on the pin members 104 by their close contact with the inner surfaces of the opener disks 11 (i.e., the wear plates 105, 106 are sandwiched between the inner surfaces of the opener disks 11 and the protruding portions of the metal ball 103).

As mentioned above, the support bracket 101 has openings 35 in its upper end for coupling with corresponding openings 34 in the lower end of the shank 23. Suitable fasteners extend through the openings 34, 35 in the shank 23 and the support bracket 101 to couple the parts together. For example, bushings 38 can be inserted into the openings 35 in the upper end of the support bracket 101, and then rivets and/or button head cap screws can be used to couple the support bracket 101 to the shank 23. In the illustrated embodiment, a cap screw 110 and nut 111 are used to draw the sheet metal halves of the lower end of the shank 23 together tight on the bushings 38. A first rivet 112 is then installed through the other openings 34, 35. After installing the first rivet 112, the cap screw 110 can then be replaced by a second rivet 112 to reduce clearance problems with the opener disks 11.

Figure 6:
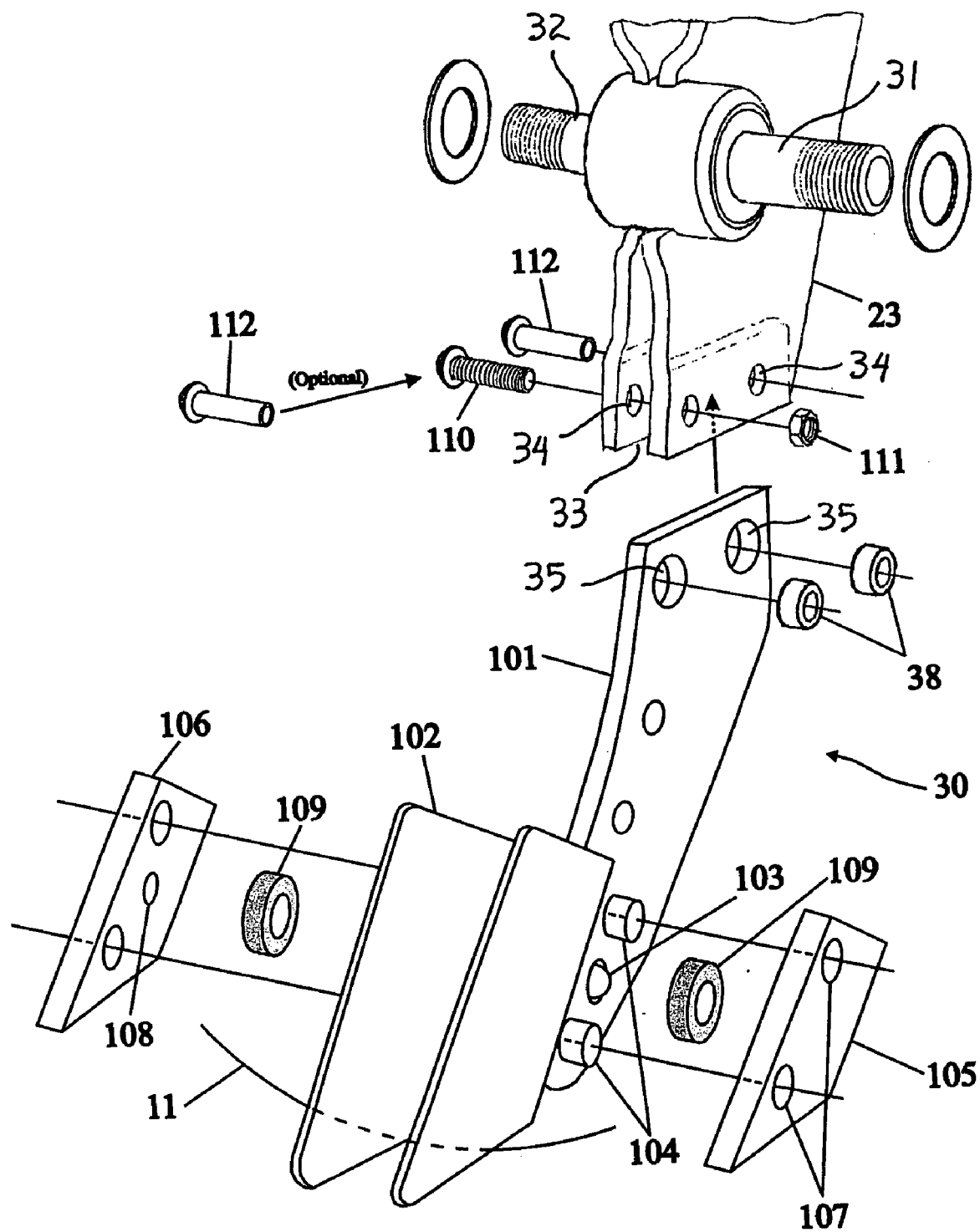
FIG. 6 is an exploded perspective view of the seed tube guard assembly shown in FIG. 5.
Figure 8:
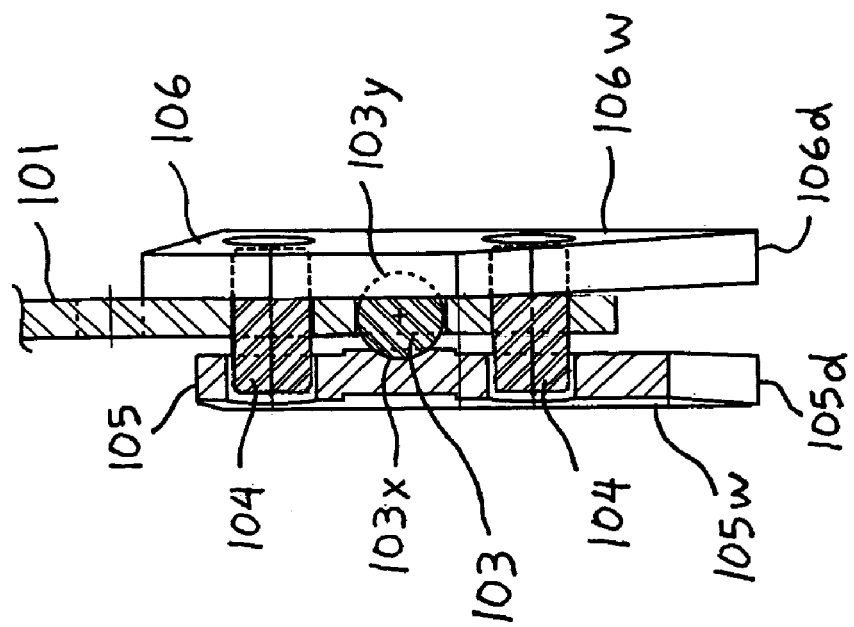
FIG. 8 is an end view in partial cross section of the lower portion of the seed tube guard assembly of FIG. 7, with the partial cross section being taken along the line A—A in FIG. 7.
Figure 7:
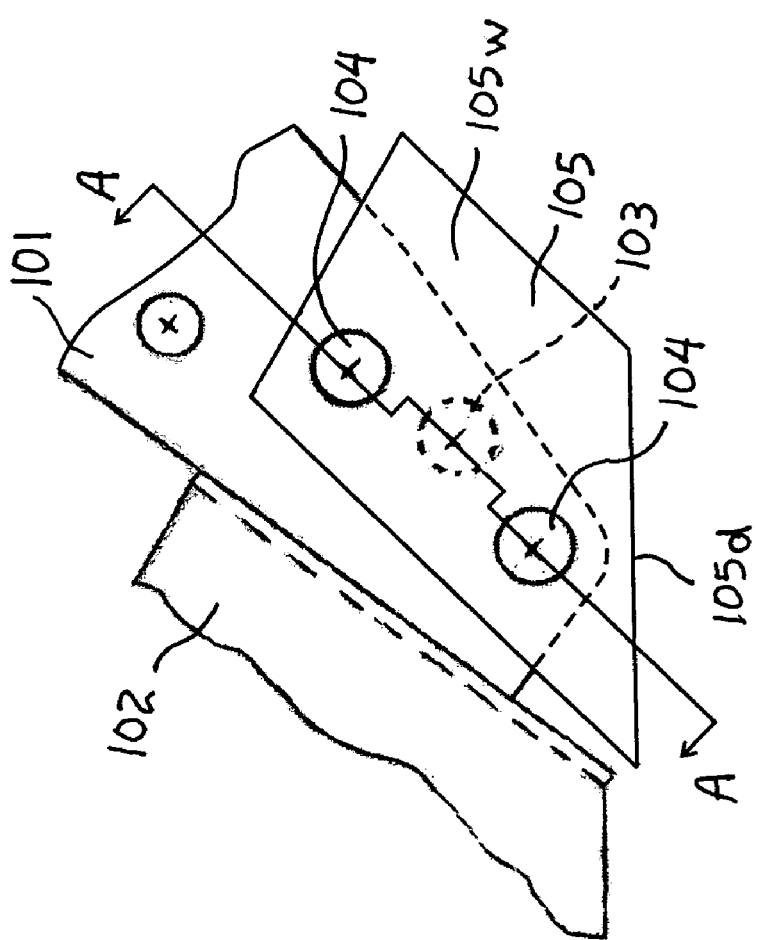
FIG. 7 is a detail side view of a lower portion of the seed tube guard assembly of the present invention.
Figure 9:
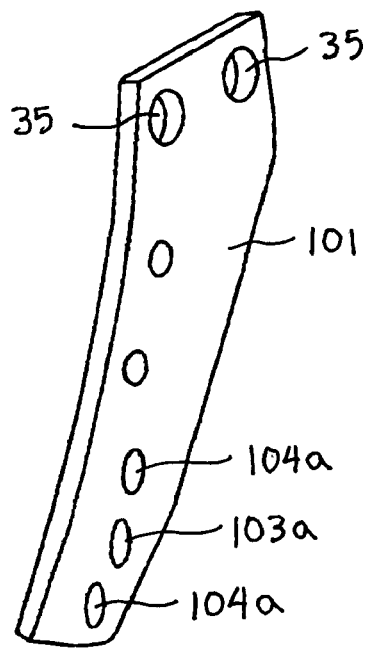
FIG. 9 is a perspective view of a support bracket of the seed tube guard assembly according to the present invention.
Figure 10:
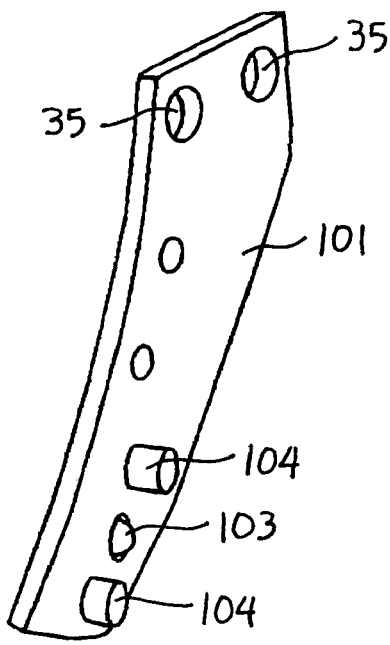
FIG. 10 is a perspective view of the support bracket shown in FIG. 9 with a pair of dowels and a steel ball press fit into openings at the lower portion thereof.
Figure 11:
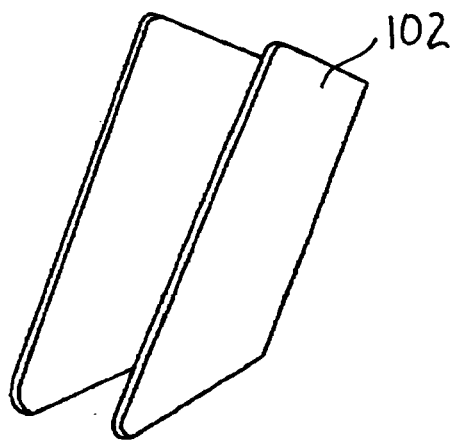
FIG. 11 is a perspective view of a seed tube guide to be welded to a rear edge of the support bracket.
Figure 12:
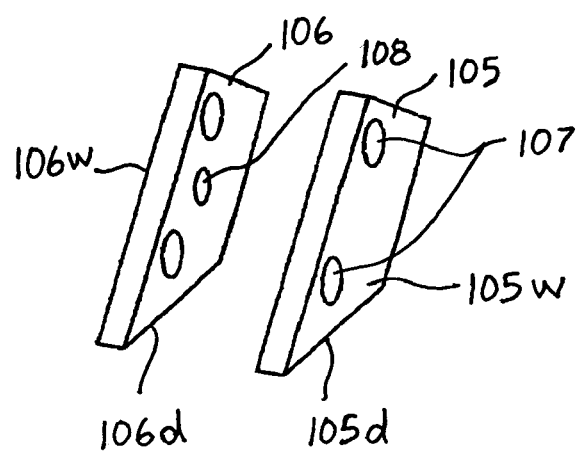
FIG. 12 is a perspective view of the wear plates to be installed onto the dowels shown at the lower portion of the support bracket in FIG. 10.

The mounting shown in FIGS. 5 and 6 is for John Deere MaxEmerge planters manufactured from 1974 to 2004 and similar planters. This mounting can be revised to accommodate later model planters and planters made by other manufacturers.

The seed tube guard assembly 30 described herein allows the wear plates 105, 106 to fully contact the inner surfaces of the opener disks 11 when loaded. The pressure of the soil against the disks 11 is imparted to the wear plates 105, 106, which are in turn supported by the metal ball 103. As the soil pressure varies, the wear plates 105, 106 pivot on the ball 103 assuring nearly uniform pressure between the wear plates 105, 106 and the opener disks 11. The pin members 104 support the frictional load on the outer wear surface of the wear plates 105, 106.

The advantages of the seed tube guard assembly 30 of the present invention as compared to conventional seed tube guards are as follows:

1. The wear plates 105, 106 can pivot on the metal ball 103 such that wear is nearly evenly distributed across the wear surfaces. This allows the coated surface of the wear plates 105, 106 to be very thin and makes it feasible to use some extremely durable materials for the hard surface coating. The very thin coating might also make it feasible to use more exotic and expensive wear materials, such as those marketed by the Nano Steel Company, LLC. Even less durable materials can be used to fuller advantage because the wear is spread out over a wider area.

2. The wear resistance of the material of the wear plates 105, 106 is superior to all heat-treated steels and conventional weld hard surfacing. As a result, the wear life of the seed tube guard assembly 30 should be many times that of other seed tube guards. This material may also do less damage to the inner surface of the opener disks 11 than the material of other guards. Increased wear resistance should reduce the maintenance required to replace the guard 30 and seed tubes 15. Another benefit is that a furrow 13 having a consistent width is produced by the planter for a longer period of time. The result is more accurate placement of the seed.

3. When the wear plates 105, 106 need replacement it is a simple matter to remove the plates and replace them with new parts. The support bracket 101 should last several times as long as the wear plates 105, 106, and probably will not require replacement during the normal life of the planter.

4. Because the coated wear plates 105, 106 are extremely durable and are easily installed and removed, it is more feasible to provide a wide and a narrow option for the seed tube guard assembly 30.

5. The heat-treated support bracket 101, heat-treated bushings 38, and increased wear due to the larger diameter of the bushings 38 (e.g., ½" diameter), all contribute to make the mounting more durable and consistent with the increased durability of the wear plates 105, 106.

6. Using larger diameter bushings 38 (e.g., ½ inch) allows the seed tube guard assembly 30 to be mounted on badly worn shank assemblies 23 with no reduction in the quality of the joint.

Figure 4:
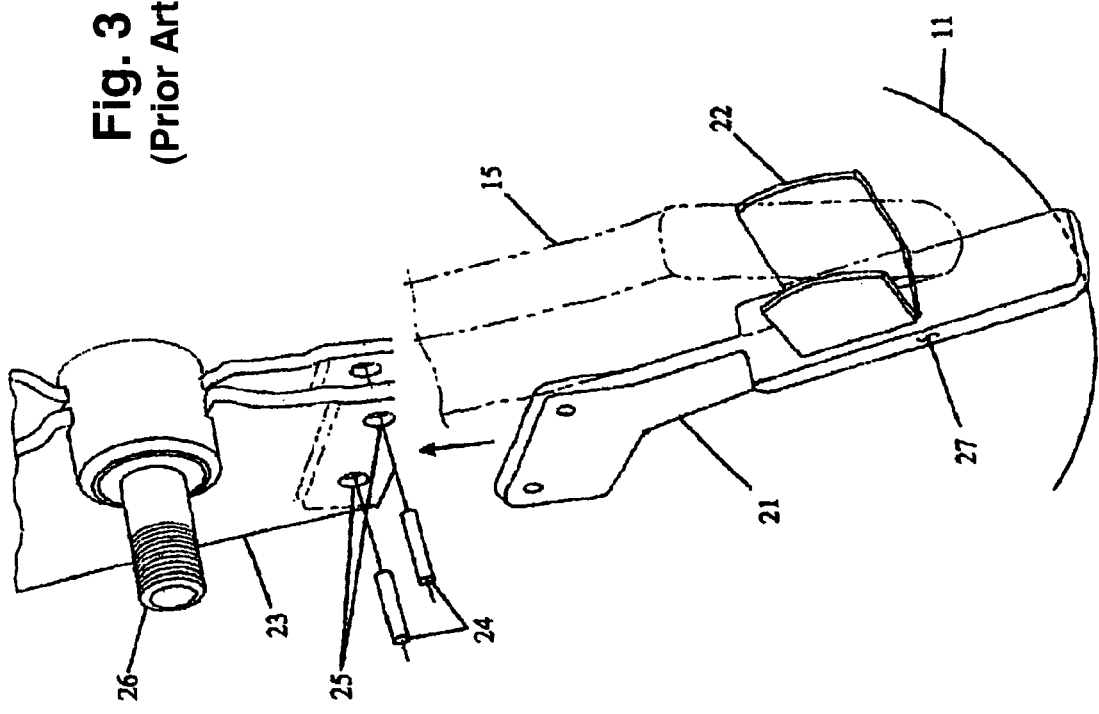
FIG. 4 is a perspective view of another conventional seed tube guard and box arrangement.

7. The seed tube guide 102 is a very simple and economical part that performs three functions. It forces the seed tube 15 to stay centered on the seed tube guide 102, thereby preventing the seed tube 15 from contacting the opener disks 11. The seed tube guide 102 also prevents seed from contacting the inner surfaces of the opener disks 11, which could reduce placement accuracy. The sides of the seed tube guide 102 extend beyond the periphery of the opener disks 11 and reduce the chance of dry soil falling into the furrow 13 before the seed has been placed. The conventional seed tube guard 21 shown in FIG. 4 may also perform these functions, but has a more complicated and expensive design.

Various alternative embodiments for the seed tube guard 30 of the present invention are also possible. For example, parts of the seed tube guard assembly 30 can be made as a casting using, for example, materials containing chrome and nickel or other suitable alloys.

While the invention has been specifically described in connection with specific embodiments thereof, it is to be understood that this is by way of illustration and not of limitation, and the scope of the appended claims should be construed as broadly as the prior art will permit.

What is claimed is:

1. A seed tube guard assembly for an agricultural planter, comprising:
   a support bracket having an upper end adapted to be attached to a planter shank assembly and a lower end adapted to be positioned between a pair of opener disks;
   a seed tube guide extending rearwardly from the support bracket for centering a seed tube between the pair of opener disks, preventing seed falling from the seed tube from contacting inner surfaces of the opener disks, and preventing soil from falling into a furrow made by the opener disks before seed has been placed in the furrow; and
   first and second floating wear plates disposed on respective right and left sides of the support bracket in front of said seed tube guide for engaging inner surfaces of the opener disks of the planter, said floating wear plates being arranged to float between respective sides of the support bracket and the inner surfaces of the opener disks during use;
   further comprising a pair of pin members protruding from each of the right and left sides of the support bracket, and said wear plates each have a pair of holes formed therein for receiving said pin members and allowing said respective wear plates to move freely on the pin members relative to said support bracket; and
   wherein said pin members comprise a pair of dowels that are pressed into openings in the support bracket and protrude from both the right and left sides of the support bracket.

2. A seed tube guard assembly for an agricultural planter, comprising:
   a support bracket having an upper end adapted to be attached to a planter shank assembly and a lower end adapted to be positioned between a pair of opener disks;
   a seed tube guide extending rearwardly from the support bracket for centering a seed tube between the pair of opener disks, preventing seed falling from the seed tube from contacting inner surfaces of the opener disks, and preventing soil from falling into a furrow made by the opener disks before seed has been placed in the furrow; and
   first and second floating wear plates disposed on respective right and left sides of the support bracket in front of said seed tube guide for engaging inner surfaces of the opener disks of the planter, said floating wear plates being arranged to float between respective sides of the support bracket and the inner surfaces of the opener disks during use;
   further comprising a pair of pin members protruding from each of the right and left sides of the support bracket, and said wear plates each have a pair of holes formed therein for receiving said pin members and allowing said respective wear plates to move freely on the pin members relative to said support bracket; and
   further comprising respective protrusions disposed between the pin members on the right and left sides of the support bracket for providing a fulcrum on which the respective floating wear plates pivot to allow wear to be nearly evenly distributed across outer surfaces of the wear plates.

3. The seed tube guard assembly according to claim 2, wherein said respective protrusions are opposite sides of a metal ball press fit into an opening in the support bracket between said pin members.

4. The seed tube guard assembly according to claim 3, wherein said wear plates each have an indentation on an inner surface thereof for engaging said metal ball.

5. The seed tube guard assembly according to claim 3, further comprising a foam rubber adhesive coated washer positioned over the metal ball on each side of the support bracket for holding the wear plates in position during assembly.

6. The seed tube guard assembly according to claim 2, wherein said wear plates each have an indentation on an inner surface thereof for engaging said metal ball.

7. The seed tube guard assembly according to claim 2, wherein the upper end of said support bracket comprises a pair of mounting holes and a pair of bushings adapted to fit into the mounting holes, the bushings and mounting holes being usable to secure the support bracket to a planter shank assembly using a pair of fasteners.

8. The seed tube guard assembly according to claim 2, wherein said wear plates each have an outer wear surface facing outwardly from said support bracket for engaging said inner surfaces of the opener disks, and said outer wear surface has a hard surface coating for increasing a wear life of the plate.

9. The seed tube guard assembly according to claim 2, wherein said wear plates are made from heat-treated steel.

10. A seed tube guard assembly for an agricultural planter, comprising:
    a support bracket having an upper end adapted to be attached to a planter shank assembly and a lower end adapted to be positioned between a pair of opener disks;
    a seed tube guide extending rearwardly from the support bracket for centering a seed tube between the pair of opener disks, preventing seed falling from the seed tube from contacting inner surfaces of the opener disks, and preventing soil from falling into a furrow made by the opener disks before seed has been placed in the furrow; and
    first and second floating wear plates disposed on respective right and left sides of the support bracket in front of said seed tube guide for engaging inner surfaces of the opener disks of the planter, said floating wear plates being arranged to float between respective sides of the support bracket and the inner surfaces of the opener disks during use;
    wherein said wear plates each have an outer wear surface facing outwardly from said support bracket for engaging said inner surfaces of the opener disks, and said outer wear surface has a hard surface coating for increasing a wear life of the plate; and
    wherein said hard surface coating is a tungsten carbide nickel coating.

11. A furrow opener assembly for an agricultural planter, comprising:

a planter shank having a pair of opener disks rotatably mounted thereto, and a seed tube and seed tube guard assembly positioned between the opener disks;

wherein said seed tube guard assembly comprises:

a support bracket having an upper end attached to the planter shank and a lower end positioned between the pair of opener disks;

a seed tube guide extending rearwardly from the support bracket for receiving a lower end of the seed tube; and first and second floating wear plates disposed on respective right and left sides of the support bracket in front of said seed tube guide for engaging inner surfaces of said opener disks, said floating wear plates being arranged to float between respective sides of the support bracket and the inner surfaces of the opener disks during use;

wherein said seed tube guard assembly further comprises a pair of dowels that are pressed into openings in the support bracket and protrude from each of the right and left sides of the support bracket, and said wear plates each have a pair of holes formed therein for receiving said dowels and allowing said respective wear plates to move freely on the dowels relative to said support bracket.

12. The furrow opener assembly according to claim 11, wherein said seed tube guard assembly further comprises a metal ball press fit into an opening in the support bracket between said dowels with opposite sides of the metal ball protruding from the right and left sides of the support bracket for providing a fulcrum on which the respective floating wear plates pivot to allow wear to be nearly evenly distributed across outer surfaces of the wear plates.

13. The furrow opener assembly according to claim 12, wherein said wear plates each have an indentation on an inner surface thereof for engaging said metal ball.

14. A seed tube guard assembly for an agricultural planter, comprising:

a support bracket having an upper end adapted to be attached to a planter shank assembly and a lower end adapted to be positioned between a pair of opener disks;

a seed tube guide extending rearwardly from the support bracket for receiving a lower end of a seed tube between the opener disks;

a pair of dowels pressed into openings in the support bracket and protruding from the right and left sides of the support bracket;

a metal ball press fit into an opening in the support bracket between said dowels with opposite sides of the metal ball protruding from the right and left sides of the support bracket; and first and second floating wear plates each having a pair of holes for mounting the wear plates over the dowels on the respective right and left sides of the support bracket with the protruding sides of the metal ball engaging the wear plates at respective fulcrum points between the dowels.

15. The seed tube guard assembly according to claim 14, wherein said wear plates each have an indentation on an inner surface thereof for engaging said metal ball.

* * * * *